(12) United States Patent
Putrello, Jr.

(10) Patent No.: US 8,887,436 B1
(45) Date of Patent: Nov. 18, 2014

(54) POCKET SURVIVAL SNARE

(71) Applicant: Andrew Carmen Putrello, Jr., Utica, NY (US)

(72) Inventor: Andrew Carmen Putrello, Jr., Utica, NY (US)

( * ) Notice: Subject to any disclaimer, the term of this patent is extended or adjusted under 35 U.S.C. 154(b) by 147 days.

(21) Appl. No.: 13/694,424

(22) Filed: Nov. 30, 2012

(51) Int. Cl.
*A01M 23/34* (2006.01)

(52) U.S. Cl.
CPC ..................................... *A01M 23/34* (2013.01)
USPC ................................................... 43/87; 43/86

(58) Field of Classification Search
USPC ........................................................ 43/85–87
IPC ............................................... A01M 23/00,23/34
See application file for complete search history.

(56) References Cited

U.S. PATENT DOCUMENTS

| | | | | |
|---|---|---|---|---|
| 1,015,845 A | * | 1/1912 | Shaw .................................. | 43/86 |
| 1,841,872 A | * | 1/1932 | Bjornseth .......................... | 43/87 |
| 4,180,937 A | * | 1/1980 | Webster ............................ | 43/87 |

FOREIGN PATENT DOCUMENTS

| | | | | |
|---|---|---|---|---|
| FR | 2626739 A1 | * | 8/1989 | ............ A01M 23/34 |
| JP | 10191867 A | * | 7/1998 | ............ A01M 23/24 |
| JP | 2006006234 A | * | 1/2006 | |
| JP | 2012039924 A | * | 3/2012 | |

OTHER PUBLICATIONS

Machine translation of FR 2626739 to Pont, published Aug. 1989.*
Machine translation of JP 10191867 to Saito, published Jul. 1998.*
Machine translation of JP 2006006234 to Toumine, published Jan. 2006.*
Machine translation of JP 2012039924 to Kinoshita, published Mar. 2012.*

* cited by examiner

*Primary Examiner* — Darren W Ark
*Assistant Examiner* — Kathleen Alker

(57) ABSTRACT

In accordance with the present invention, there is provided a portable pocket survival snare that includes a manually windable wire snare within a low profile body assembly that incorporates a mounting loop. The storable manually windable wire snare is held in position within the body assembly, using a snap-mounted mounting ring assembly that is snapped into position around the outside perimeter of the body assembly. The mounting ring assembly is also used to position the pocket survival snare during use. The present invention also includes an escape proof sliding-locking noose and when used in conjunction with other elements of the present invention, engages automatically during operation. The wire snare is secured within the present invention using a press fit pin and then weaving the wire snare through a series of stress-relieving through-holes and non-stress-relieving through-holes that are incorporated into the invention.

1 Claim, 4 Drawing Sheets

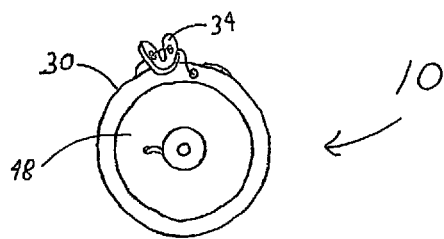
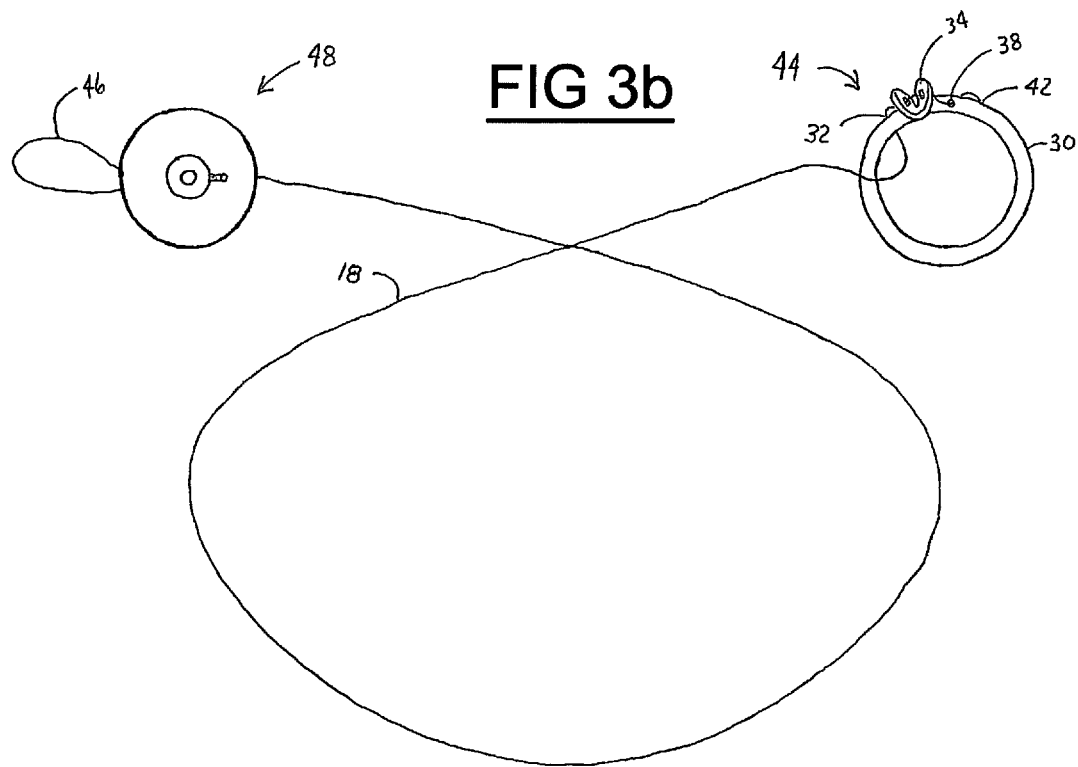

POCKET SURVIVAL SNARE

FIELD OF THE INVENTION

The present invention relates to a pocket survival snare and, more particularly, a pocket survival snare that can be manually stowed and provides a means to position and lock the pocket survival snare in the field.

BACKGROUND OF THE INVENTION

Snares used to capture wild game for food consumption and furs have been used for survival purposes for thousands of years and can be particularly useful during survival situations that take place in the wilderness. Typically several snares are carried by the user into the wilderness as it is advantageous to set up multiple snares to increase the chances of capturing wild game. Although snares have been used for thousands of years to capture wild game there has been little evolution in snare design. Presently, individuals fashion snares using lengths of string, wire, or other cordage. A loop or noose is formed using a portion of the string, wire, or other cordage, by incorporating a slip knot or wire ferrules if wire is used. One of the many problems with current snares designs is that they are bulky, difficult to carry, and often become tangled with each other or other gear while being stowed in backpacks or other storage containers. In addition, current snare designs do not allow for quick deployment of multiple snares in the field without the need for tools or substantial amounts of additional materials. In addition, current snare designs do not provide a means to securely stow the string, wire, or other cordage during travel or when not in use. Current snare designs do not provide reliable locking mechanisms that can also be stowed during travel and quickly deployed during use. During use a snare must be set up in the field on a known animal path. Current snare designs do not provide a means to position the loop or noose over a known animal path without the use of additional sections of string, wire, or other cordage to mount the snare into position in the field. In addition, current snare designs do not provide a means to facilitate the engagement of the loop or noose during use. With current snare designs the user is required to use what ever materials that could be found in the wilderness to position and mount the snare so that the plane of the loop or noose hangs over the known animal path perpendicular to the ground. This can often be difficult or impossible in actual survival situations where raw materials are at a minimum. Also, a snare must be positioned in such a way as to allow the head and neck of the animal to be engaged while traveling forward along a known animal path but not allow the shoulders of the animal to pass through the loop or noose. Current snare designs do not provide a means to do so quickly and efficiently, and as a result, accomplishing this task can require considerable effort and substantial amounts of additional material not always available in the wilderness. Once the snare is set-up and the animal has engaged the snare, the loop or noose tightens around the animals neck or limb as the animal moves forward. To prevent the entire snare from detaching and being lost with the animal the free end of the snare must be connected to a solid object such as a tree branch. The animals struggles will sometimes be enough to cause the loop or noose to tighten trapping the animal within the snare. With current designs It is possible for the animal to free itself by causing the loop or noose to loosen. Current snare designs do not provide a means to both quickly mount the snare to a solid object and lock the loop or noose in the field without the use of a substantial amounts of additional string, wire, or other cordage to do so. The free end of the snare loop or noose can also be attached to a bent sampling, and, or, some type of trigger mechanism. In this scenario the animal will be lifted into the air as the trigger mechanism is tripped by the animal's movement forward while engaging the loop or noose of the snare with their head and neck. Tripping the trigger mechanism causes the bent sapling to return to it's upright position hanging the animal unless the animal is able to escape before the trigger mechanism is released. Current snare designs provide no means to mount the snare to a bent sampling without the need for substantial amounts of additional string, wire, or cordage and do not provide a sure locking mechanism that cannot be disengaged by the animal's struggles. Ever since snares have been used to capture wild game in the wilderness there has been a need for one invention that would provide a complete snare system that included a storable wire snare, a deployable sliding locking mechanism, a means to mount the snare into position over a known animal path and or trigger mechanism, without the need for a substantial amounts of additional materials all in one portable, safe, durable device that could be carried in ones pouch or pocket. The present invention addresses the aforementioned problems by using a structural design that is aimed at minimizing the negative effects thus increasing the likelihood that the individual will carry the pocket survival snare and realize it's benefits.

SUMMARY OF THE INVENTION

In accordance with the present invention, there is provided . . . a portable pocket survival snare that includes a manually windable flexible wire snare that is stowed within a body assembly that includes outside reflective surfaces and a mounting loop that is used to position and mount the pocket survival snare in the field during use. The manually windable flexible wire snare is wound within a body assembly that contains opposing side walls separated by a body wall spacer specifically sized for the diameter of the flexible wire snare thus minimizing physical profile of the invention. The storable manually windable wire snare is held in position within the body assembly, using a snap-mounted mounting ring assembly that is concentric to the body assembly and snapped into position around the outside perimeter of the body assembly. The mounting ring assembly is also used to position the pocket survival snare in the field during use. The present invention also includes a snare lock and escape proof sliding-locking noose that is mounted and stowed on the snap-mounted ring assembly and when used in conjunction with other elements of the present invention, are engaged automatically during operation tightening around the animals neck or limbs killing or disabling the animal instantly. The wire snare is mounted within the present invention by securing the wire snare to the mounting ring using a press fit pin and then weaving the wire snare through a series of stress-relieving through-holes and non-stress-relieving through-holes that are incorporated into the mounting ring, body assembly, and snare lock, that comprise the present invention. The present invention forms a complete snare system that can be carried in ones pocket or pouch and quickly deployed, mounted, or stowed in the field.

It would be advantageous to provide a . . . complete pocket survival snare system in one device that could be carried in ones pocket It would also be advantageous to provide a . . . complete pocket survival snare system that could be quickly deployed in the field It would further be advantageous to provide a . . . complete pocket survival snare system that could be quickly stowed in the field It would also be advantageous to provide a . . . pocket survival snare that included a mounting ring that could be used to position the wire snare during use It would further be advantageous to provide a . . . pocket survival snare that included a mounting ring that included a snare wire stress relief hole It would also be advantageous to provide a pocket survival snare that included a mounting ring that worked in conjunction with a snare lock It would further be advantageous to provide a pocket survival snare that included a mounting ring that worked in conjunction with a snare noose It would also be advantageous to provide a pocket survival snare that included an escape proof sliding-locking snare noose It would further be advantageous to provide a pocket survival snare that included a mounting ring that could be snap mounted to a body assembly It would also be advantageous to provide a pocket survival snare that included a body assembly that could be used to stow the wire snare It would further be advantageous to provide a pocket survival snare that included a body assembly that incorporated a mounting loop that could be used to attach the wire snare to a trigger mechanism during use It would also be advantageous to provide a pocket survival snare that included a body assembly side wall top that included an off-center stress relief wire mounting hole It would further be advantageous to provide a pocket survival snare that included a body assembly with reflective surfaces It would also be advantageous to provide a pocket survival snare system that would allow the user to carry multiple snares without the risk of entanglement

BRIEF DESCRIPTION OF THE DRAWINGS

A complete understanding of the present invention may be obtained by reference to the accompanying drawings, when considered in conjunction with the subsequent, detailed description, in which:

FIGS. 3a and 3b show a top perspective view of a pocket survival snare in both closed and open configurations without sliding-locking noose deployed.

For purposes of clarity and brevity, like elements and components will bear the same designations and numbering throughout the Figures.

DESCRIPTION OF THE PREFERRED EMBODIMENT

Figure 1:
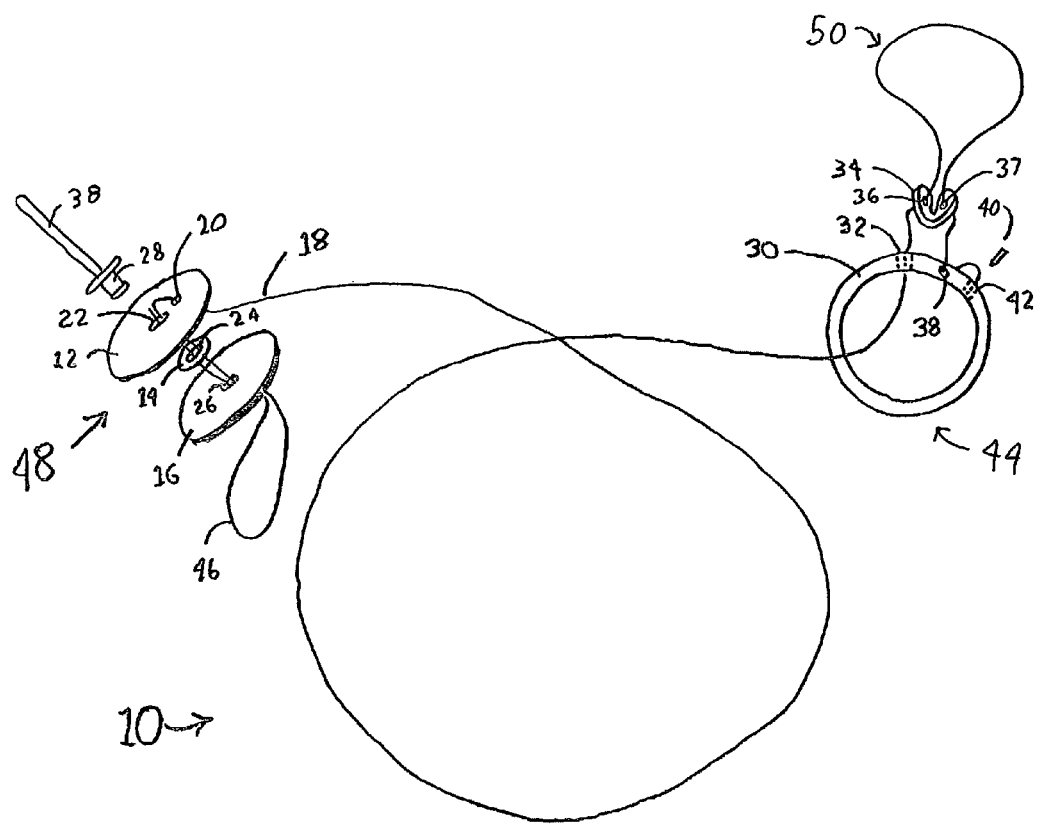
FIG. 1 is a perspective in a exploded condition view of an exploded view of pocket survival snare.

Referring to FIGS. 1 to 4c each element of the pocket survival snare 10 is briefly described. A full description of the function and operation of the pocket survival snare 10 will follow. The pocket survival snare 10 of the invention includes, a body side wall top 12 that has a center hole 22 to accommodate rivet 28, an off center wire mounting hole 20, and has a reflective outer surface. The body side wall top 12 is preferably fabricated from metal but could be fabricated from plastic or other suitable materials. Underneath the body side wall top 12 there is the body wall spacer 14 which also has a center hole 24 to accommodate rivet 28. The body wall spacer 14 is preferably fabricated from metal although plastic or other suitable materials could be used. The body wall spacer 14 is designed to accommodate the specific wire snare 18 diameter being used and is very thin being approximately 0.040" thick to provide just enough space for the wire snare 18 that is approximately 0.035" thick to be wound within the assembled invention thus keeping the thickness of the assembled invention as thin as physically possible. Beneath body wall spacer 14 there is the body side wall bottom 16. The body side wall bottom 16 also has a center hole 26, to accommodate rivet 28, has a reflective outer surface, and is preferably fabricated from metal although plastic or any suitable material could be used. To assemble the body assembly 48 of the pocket survival snare 10 the wire snare 18 must be securely mounted during assembly. The wire snare 18 is constructed using a small diameter solid or multi-strand cable wire that is flexible enough to be manually wound repeatedly without deforming or breaking. To mount the wire snare 18, the wire snare 18 is woven through the off center wire mounting hole 20 from underneath the body side wall top 12 and then woven down and through the center hole 22 in the body side wall top 12. The wire snare 18 is then woven through the body wall spacer 14 through hole 24 and through the body side wall bottom 16 through hole 26. Once woven through through hole 26 a loop approximately 1.25" in diameter is formed using the wire snare 18 to form the mounting loop 46. Once the mounting loop 46 is formed the wire snare 18 is then woven back through through hole 26, through hole 24, and through hole 22. The wire is left extended approximately ¼" beyond the outside top plane of body side wall top 12. The entire body assembly 48 is placed in a fixture and rivet 28 is inserted through holes 22, 24, and 26. Once the rivet 28 is in place the mandrel 38 of the rivet 28 is pulled though and snapped off the rivet 28 thus expanding the diameter of rivet 28, and in the process, securely connecting body side wall top 12, body wall spacer 14, body side wall bottom 16 and wire snare 18 into one unit called the body assembly 48 and simultaneously securely forms the mounting loop 46. The advantage of weaving the wire snare 18 through the body assembly 48 in this fashion is that nearly all of the stress placed on the wire snare 18 during use is taken off the junction between the rivet 28 wall and the wire and placed at the junction between the wire snare 18 and the inside edge of hole 20. Once the body assembly 48 is assembled the wire snare 18 is woven through hole 32 in mounting ring 30 starting from the inside of mounting ring 30 and then through holes 36 and 37 in the snare lock 34. Once the wire snare 18 is woven through holes 36 and 37 in the snare lock 34 the wire snare 18 is then woven through hole 38 that is positioned between and perpendicular to holes 32 and 42 in the mounting ring 30 and then woven through hole 42 in the mounting ring 30 from the outside of the mounting ring 30 down through and toward the inside of mounting ring 30 and then held in position and connected using wire pin 40 that is press fit into hole 42 thus securely mounting the wire snare 18 and slideably mounting snare lock 34 to the mounting ring 30 creating the mounting ring assembly 44. Mounting the snare lock 34 and wire snare 18 to the mounting ring 30 in this fashion eliminates stress on the wire pin 40 during use, allows the user to form a sliding-locking noose 50 during use that is formed using the snare lock 34 in conjunction with the mounting ring 30, allows the snare lock 34 to slide during use, and in addition, has many advantages and uses that will be explained below. The mounting ring 30 is a metal ring sized to snap fit between the body side wall top 12 and body side wall bottom 16 of the body assembly 48, and is used in conjunction with the snare lock 34 to form an escape proof sliding-locking noose 50, and also allows the body assembly 48 to be woven though the mounting ring assembly 44 during use as will be explained further in the text below.

Figure 2:
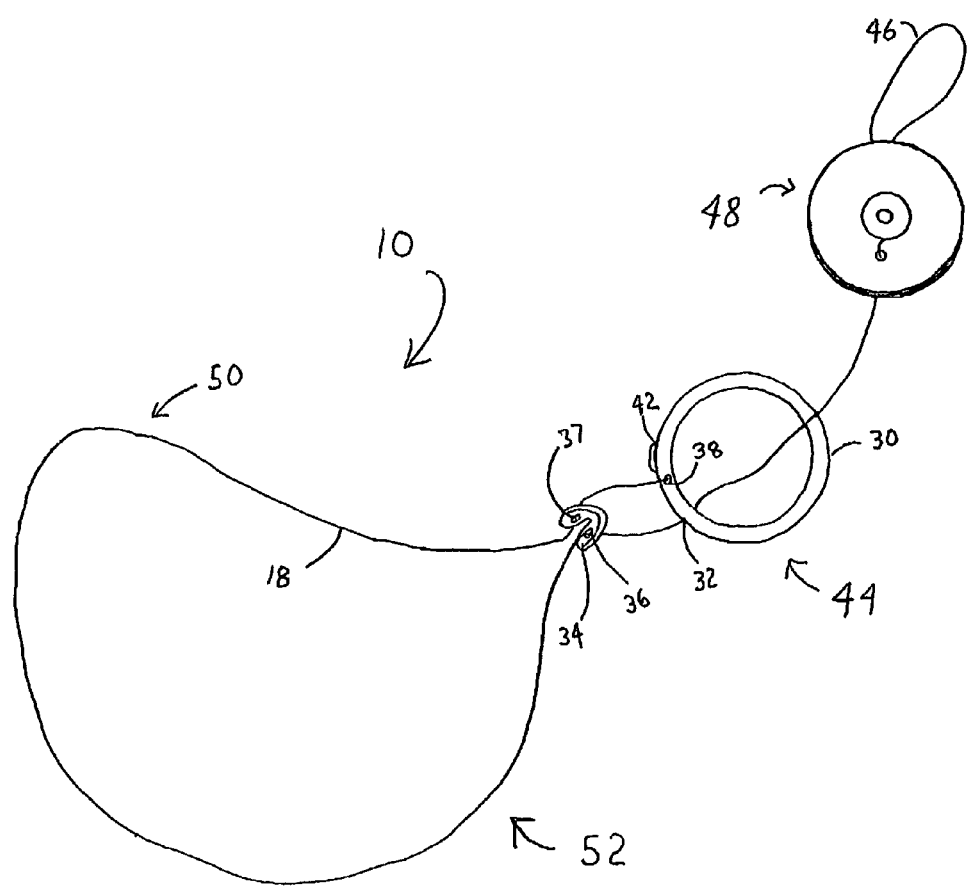
FIG. 2 is a perspective view of a shows the pocket survival snare in working configuration with sliding-locking noose deployed.
Figure 4A:
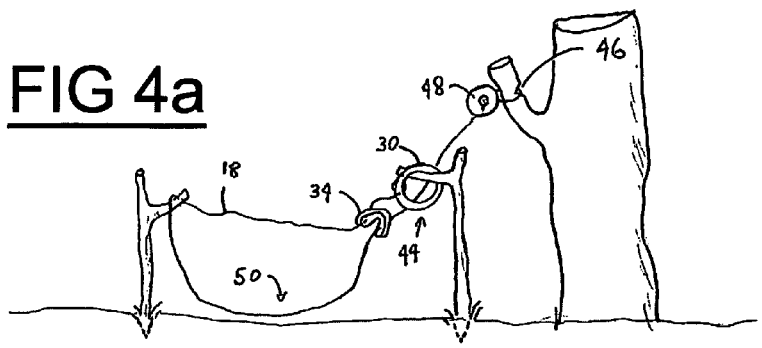
FIG. 4a-4c show a perspective view of a different methods of deployment of the pocket survival snare in the field.
Figure 4B:
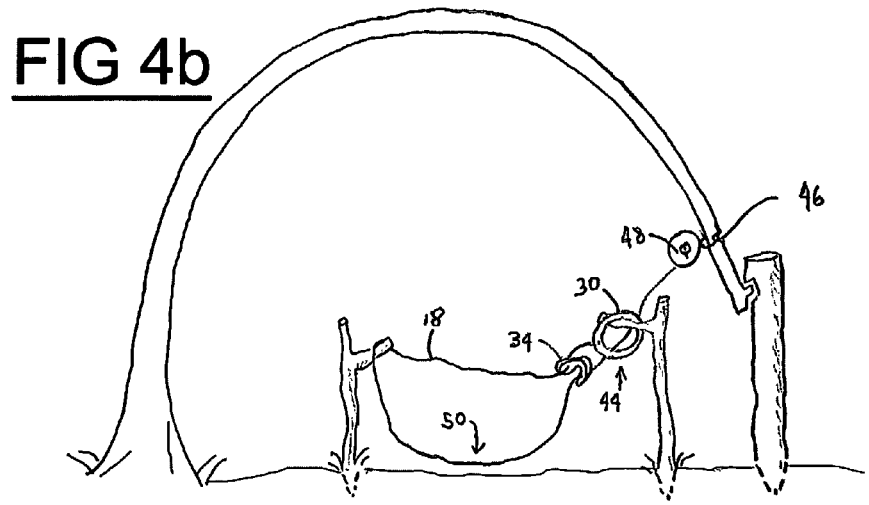
Figure 4C:
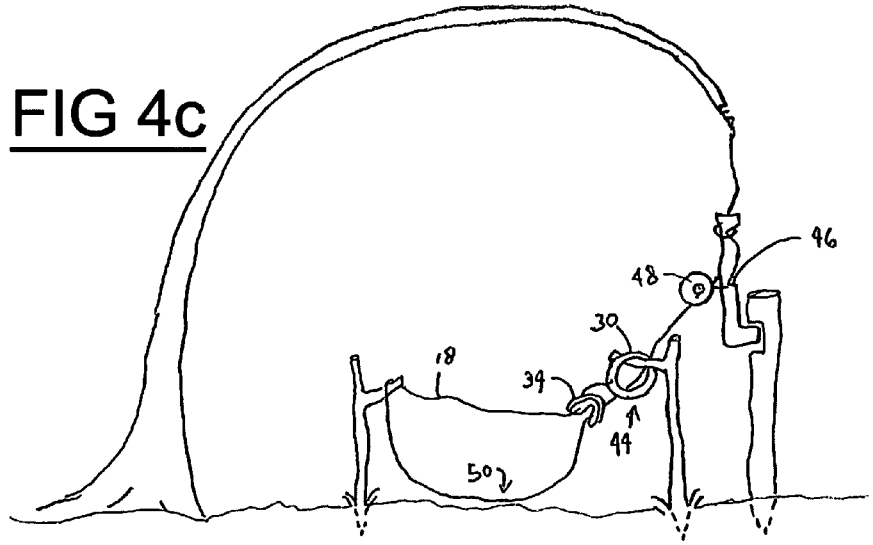

In operation and referring to FIGS. 1-4c, the user would begin with the pocket survival snare 10 in the closed or stored position as shown in FIG. 3a. To use the pocket snare in the wilderness to snare wild game the user must first open the pocket survival snare 10 and release the wire snare 18 from the body assembly 48. To accomplish this task the user simply holds the mounting ring 30 of the mounting ring assembly 44 with their finger tips and presses the outside edge of the body assembly 48 with their thumb until the body assembly 48 releases and falls through the mounting ring 30 of mounting ring assembly 44 towards the ground allowing the wire snare 18 to manually unwind from the body assembly 48. Initially the open pocket survival snare 10 appears as shown in FIG. 3b but there is one more step that must be done before the pocket survival snare 10 is fully deployed and ready for use. Now referring to FIG. 2, next the user must use the snare lock 34 and holes 32, 36, and 37 to form the sliding-locking noose 50 of the pocket survival snare 10. This is done by pulling the wire snare 18 through snare lock 34 holes 36 and 37 allowing the wire snare 18 to slide through hole 32 in the mounting ring 30 of mounting ring assembly 44 forming a sliding-locking noose 50 of any desired diameter as shown in FIG. 2. Next the user must position the pocket survival snare 10 on a known or suspected animal path with the sliding-locking noose 50 positioned perpendicular to the ground at a height that will permit entry of the animal's head and neck into the sliding-locking noose 50 of the pocket survival snare 10. The user can very quickly position the fully deployed pocket survival snare 10 in the field by hanging the left top portion of the sliding-locking noose 50 over the end of a broken tree branch, bush, or a stick pressed into the ground and then hanging the top right portion of the sliding-locking noose 50 over another broken branch, brush, or stick pressed into the ground using the mounting ring 30 of mounting ring assembly 44. Using the mounting ring 30 of mounting ring assembly 44 to hang the pocket survival snare 10 into position prevents tangling and ensures smooth operation during use as all of the sliding elements of the invention are always held in the correct position relative to each other in space at all times. This allows the sliding-locking noose 50 to quickly and smoothly be engaged and tighten around the animal's neck or limb as the wire snare 18 is guided through hole 32 in the mounting ring 30 of mounting ring assembly 44 and holes 36 and 37 in the snare lock 34 as to be explained further below Next the user would use the mounting loop 46 directly or by first weaving the body assembly 48 through the mounting loop 46 to attach the body assembly 48 end of the survival pocket snare to a rigid or flexible structure such as a short broken branch on a tree trunk or flexible trigger mechanism such as a bent sapling. When the animal's head and neck are engaged in the sliding-locking noose 50 the animal's struggles will cause the sliding-locking noose 50 to tighten. As the sliding-locking noose 50 tightens the mounting ring 30 of the mounting ring assembly 44 slides towards the snare lock 34 preventing any movement of the snare lock 34 initiating a double locking system forming an escape proof locking mechanism. If a trigger mechanism, such as a bent over sampling, is used the animal's struggles will cause the trigger mechanism to be released lifting the animal into the air thus hanging the animal with the sliding-locking noose 50 that is held tight using the snare lock 34 and mounting ring 30 of the mounting ring assembly 44. Three typical pocket survival snare 10 set ups are shown in FIGS. 4a-4c. As can be seen in FIG. 4a-4c one end of the sliding-locking noose 50 of the pocket survival snare 10 is looped over the top of a Y shaped broken tree branch that pressed into the ground, and the mounting ring 30 of mounting ring assembly 44 is used on the other side of the sliding-locking noose 50 to loop over the top of a second Y shaped broken tree branch pressed into the ground on the other side of the animal path. The body assembly 48 of the pocket survival snare 10 is then woven through the mounting ring 30 of the mounting ring assembly 44 and using mounting loop 46 the body assembly 48 is mounted to a fixed tree branch or a trigger mechanism using a bent sapling as one of the working members of the snare system. Once the animal's head and neck engage the sliding-locking noose 50 the animals shoulders tug on the sliding-locking noose 50 causing the mounting ring 30 of the mounting ring assembly 44 to be pulled off of the Y shaped tree branch pressed into the ground. If the body assembly 48 is attached to a fixed tree branch using the mounting loop 46, the animals struggles will cause the sliding-locking noose 50 to tighten and lock automatically using the snare lock 34 together with the mounting ring 30 of the mounting ring assembly 44 thus disabling or killing the animal instantly. If a bent sapling is used with a trigger mechanism, the animal's struggles will cause the mounting ring 30 of the mounting ring assembly 44 to be pulled off of the Y shaped tree branch pressed into the ground thus releasing the trigger mechanism causing the sapling to snap back to its original position. This causes the sliding-locking noose 50 to tighten and lock in conjunction with the mounting ring 30 of the mounting ring assembly 44 automatically around the animals neck or limb with great force disabling or killing the animal instantly. To release the captured animal from the pocket survival snare 10 the user simply slides back the snare lock 34 and mounting ring 30 of the mounting ring assembly 44 and removes the sliding-locking noose 50 then winds the wire snare 18 back up into the body assembly 48 and the pocket survival snare 10 is ready for another use.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A pocket survival snare for providing a portable means to capture wild game for survival purposes, comprising:
   a stainless steel, flexible, high tensile strength, twenty-six inch long wire snare for snaring wild game;
   a metal body side wall top comprising a flat round disc having a center rivet hole and an off-center stress relief wire mounting hole, said flat round disc having a reflective outside surface for signaling purposes, said body side wall top forming a first rigid side wall;
   a metal body wall spacer having a center rivet hole specifically sized to a diameter of said wire snare, said body wall spacer being rigidly connected to said body side wall top;
   a metal body side wall bottom comprising a center rivet hole and having a reflective outside surface for signaling purposes, said body side wall bottom being rigidly connected to said body wall spacer, and said body side wall bottom forming a second rigid side wall;

a high tensile strength, stainless steel and aluminum mandrel rivet for securing said wire snare and rigidly connecting said body wall top, said body side wall bottom, and said body wall spacer together;

a metal mounting ring having one wire mounting hole, one stress relief wire through-hole, and one wire through-hole, said mounting ring being able to be mounted to wild tree limbs or branches;

a metal, noncorrosive wire pin for securing said wire snare to said mounting ring when rigidly connected to said mounting ring; and a metal, corrosion resistant snare lock bent to a ninety degree angle having wire through-holes for said wire snare to pass, said snare lock allowing a portion of said wire snare to form an adjustable sliding-locking noose to capture a wild animal when used in conjunction with said mounting ring and to lock said sliding-locking noose to prevent wild game from escaping, said snare lock being slidably connected to said sliding-locking noose and said mounting ring via said wire snare;

wherein said wire snare is securely connected to said body side wall bottom, said body wall spacer, and said body side wall top;

wherein a portion of said wire snare forms a mounting loop for mounting said pocket survival snare to small trees, branches, or flexible trigger mechanisms during use, said mounting loop being connected to said rivet; and wherein said first and second rigid side walls form a wire snare storage compartment with said body wall spacer to provide an optimum space to store said wire snare within said first and second rigid side walls to prevent said wire snare from tangling with other equipment and to allow quick deployment and mounting of said wire snare to wild tree branches or limbs using said mounting loop, said mounting ring being sized to snap fit between said body side wall top and said body side wall bottom.

\* \* \* \* \*